Sept. 5, 1967 R. C. VICKERY 3,340,108
LASER MATERIALS
Filed July 9, 1963
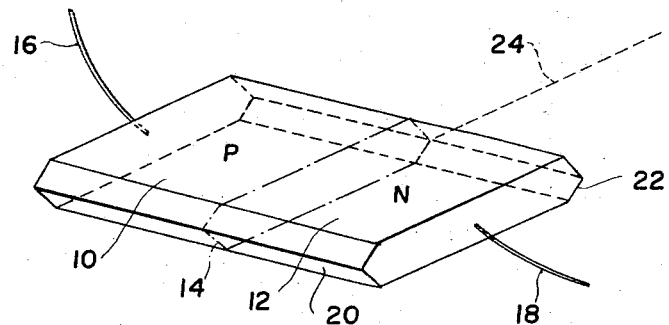
INVENTOR.
RONALD C. VICKERY
BY
his ATTORNEY United States Patent Office 3,340,108
Patented Sept. 5, 1967

3,340,108
LASER MATERIALS
Ronald C. Vickery, Saxonburg, Pa., assignor, by mesne assignments, to Semi-Elements, Inc., Saxonburg, Pa.
Filed July 9, 1963, Ser. No. 293,704
17 Claims. (Cl. 148—33)

This invention relates to materials capable of amplifying wave energy to stimulated emission of radiation, and more particularly to materials of the type described capable of amplifying wave energy through stimulated emission of radiation by the phenomenon of carrier injection at a P-N junction.

In the past, most lasers have operated on the principle of pumping light energies of various wave lengths into a single crystal of a material capable of amplifying wave energy by stimulated emission of radiation. The single crystal is placed within a resonator comprising a pair of spaced reflective surfaces separated by a distance equal to an even multiple of the wave length which it is desired to amplify. By pumping light energies into the material, a steady oscillation of a single wave length can be built up between the reflective surfaces; and if one of the reflective surfaces is only partially reflecting, a portion of the amplified energy will pass therethrough as a coherent beam of extremely high intensity. A laser of this type may, therefore, be referred to as a device for converting light energies of differing frequencies into an amplified light beam of a single or coherent frequency.

The processes involved in laser action are well known, and classically the phenomena can be summarized as related to the "pumping" of electrons, or rather their spin energy levels, to an excited energy state above their normal or "ground" energy level. Thus, the electrons surrounding the nucleus of an atom in a paramagnetic material such as a single crystal of the type mentioned above may exist in different energy states, or energy "spin" states; and the energy levels of these states may be raised by an external light energy field which is "pumped into" the paramagnetic material. After the energy levels of the electron spins are raised to an excited state above their normal or ground level, they may revert back to the ground level, whereupon the energy absorbed in the "pumping" process is liberated; and in the passage of such liberated energy quanta through the material menstruum, an orientation and accretion of such energy occurs until it is emitted as a coherent beam of rather specific wave length. The wave length, or frequency, of this emitted beam is a function of the discrete energy levels of the paramagnetic ion whose electron spins are pumped, and the light pumping energy required is also a function of these levels. Such laser action comprises light amplification by stimulated emission of radiation.

Systems and materials in which the foregoing phenomena are developed are now comparatively well known; however the efficiency of generation of coherent radiation in a laser using light pumping energies is somewhat low due to losses in optical pumping energy, inadequate crystal lineage, thermal effects and the like.

Recently, coherent radiation was observed from a forward biased P-N junction established in gallium arsenide. Such a device is described, for example, in an article by R. N. Hall et al. in Physical Review Letters, vol. 9, page 366 (1962). With such a device, light pumping energies are no longer required. Rather, electrical energy is converted directly into coherent light radiation with an extremely high efficiency. In the case of a gallium arsenide P-N junction, stimulated emission is believed to occur as a result of transitions between states of equal wave number, or equal energy value, in the conduction and valence bands. Other requirements, however, are necessary for stimulated emission to be observed from such transitions. These are: (a) the electron and hole populations within the active region must be large enough that their quasi-Fermi levels are separated by an energy greater than that of the radiation; (b) absorption losses due to other processes must be small; and (c) the active region must be contained within a cavity having a resonance falling in the spectral range within which stimulated emission is possible.

In gallium arsenide, for example, the necessary population inversion is produced by injection of carriers (i.e., electrons or holes) from the degenerate N and P type end regions of the junction into the transition region, the free carrier absorption being small compared to the band-to-band radiative recombination. This favors laser action.

As is known, a P-N junction comprises a wafer of single crystal material having one region which is P-type and another a bordering region which is N-type, the two regions being separated by a potential barrier. The N-type region has an excess of electrons or donors; while the P-type region has an excess of holes adapted to receive electrons. When a potential is applied across the junction in the forward direction, electrons will flow from the N-type region to the P-type region. In the case of gallium arsenide, a threshold value is reached as the forward current is increased where stimulated emission of radiation occurs. However, in contrast to lasers employing light pumping energies where stimulated emission of radiation occurs as a result of localized atomic levels, the phenomenon occurs at the P-N junction by virtue of transitions between electron energy bands.

As an overall object, the present invention provides novel materials for use in P-N junctions capable of converting electrical energy into light energy by stimulated emission of radiation.

More specifically, an object of the invention is to provide a P-N junction capable of amplifying wave energy by stimulated emission of radiation and comprising one or more of the elements of the rare earth series combined with one or more of the elements boron, carbon, nitrogen, silicon, phosphorus, sulphur, arsenic, antimony, selenium or tellurium in which basic composition a P-N junction is established by inclusion or diffusion of suitable impurities.

Still another object of the invention is to provide novel materials capable of converting electrical energy into light energy at different, discrete frequencies.

The above and other objects and features of the invention will become apparent from the following detailed description taken in connection with the accompanying single figure drawing which forms a part of this specification and which discloses a P-N junction formed in accordance with the present invention.

With reference now to the drawing, a P-N junction is shown comprising a P-type region 10 bounded by an N-type region 12, the two regions being separated by a transition region 14. Connected to the P and N type regions 10 and 12 are tungsten electrodes 16 and 18, respectively. The ends of the P-N junction are cut as at 20 and 22 to reflecting angles, the angles at 20 being totally reflecting and those at 22 being partially reflecting. Upon the passage of a current through the P-N junction above a threshold value, and assuming that the P-N junction is formed from materials hereinafter described, stimulated emission of radiation will occur in the transition region 14. The reflecting surfaces 20 and 22 are separated by an even multiple of the wave length which it is desired to amplify so as to form a resonant cavity effect in the transition region 14, the light produced by stimulated emission of radiation passing through the partially reflecting end 22 along the approximate path 24.

As was mentioned above, the materials from which the P-N junction are formed in accordance with the invention comprise an element of the rare earth series combined with one or more of the elements boron, carbon, nitrogen, silicon, phosphorus, sulphur, arsenic, antimony, selenium and tellurium. Any one of the rare earth elements may be combined with any one of the secondary elements, however different combinations require different current densities at the threshold and produce coherent light beams of different wave lengths as will hereinafter be shown.

It may be noted that the elements which are to be associated with the rare earth elements are those known as metalloids or chalcogenides. There is some evidence (e.g., Vickery, Nature 190, 336, 1961, Advanced Energy Conversion 1, 179, 1961) that, in rare earth metalloid and chalcogenide compounds, a resonant bonding situation exists involving both ionic and covalent crystal bonds and that this involvement may permit use of the 4f electron shell and its population in electronic processes. It is conceivable that such 4f electronic processes are involved in the carrier injection phenomena now presented and further that such may also develop in other rare earth compounds. However, I claim here as suitable for laser application only those rare earth metalloid and chalcogenide compounds which have been examined and developed specifically on the basis of the foregoing theory.

The compound comprising an element of the rare earth series combined with an element of the second group mentioned above is grown in single crystal form by well known techniques. Specifically, however, because of the relatively high melting points of rare earth metalloid and chalcogenide compounds, I prefer to prepare their single crystals by techniques such as are known as plasma jet, Verneiul or zone growth procedures. In the first two of these, the rare earth compound is first prepared as a powder by direct reaction of the elements concerned and this powder is fed through a plasma or ignited gas flame onto a rotating pedestal to form a single crystal. Alternatively, the initial powdered compound is compressed into a graphite, boron nitride or the like refractory tube and then subjected to a zone melting process which not only aids purification of the compound but also permits growth and development of single crystal material.

It may subsequently be found possible to grow and prepare single crystals of the compounds considered by these growth techniques or by simple modifications of Bridgeman-Stockbarger or Czochralski procedures. I do not, however, wish to be restricted to use of crystals grown by specific techniques.

It has been found that the compound of a rare earth element combined with an element from the second group identified above is intrinsically N-type. Accordingly, in order to produce a P-N junction, the single crystal thus formed must be doped with an impurity, such impurity being selected from the elements calcium, magnesium, copper and barium. These elements, being P-type, will thus form the P-N junction. Any one of the doping elements may be used with any one of the compounds formed from a rare earth element and any one of the elements of the second group mentioned above. Doping may be accomplished by any of the well known methods such as inclusion or diffusion. Examples of materials of the invention, the doping agent employed, the excitation (i.e., threshold current) in amperes per square meter and the emission wave length or wave lengths are as follows:

| Compound | Doping Agent | Excitation (amps/cm.²) | Emission (A.) |
|---|---|---|---|
| GdP (Gadolinium Phosphide) | Ca | 6,000 | 3,400 |
| ScC (Scandium Carbide) | Mg | 10,000 | 5,900 5,800 21,000 |
| LaB₄ (Lanthanum Tetraboride) | Ca | 5,000 | 9,300 |
| LaB₆ (Lanthanum Hexaboride) | Ca | 6,000 | 9,300 |
| Y₂C₃ (Yttrium Sesquicarbide) | Cu | 9,000 | 6,200 |
| PrP (Praseodymium Phosphide) | Ca | 15,000 | 10,000 |
| NdN (Neodymium Nitride) | Cu | 12,000 | 10,000 |
| CeS (Cerium Phosphide) | Ca | 10,000 | 6,010 |
| Ce₂S₃ (Cerium Sesquisulfide) | Ca | 13,000 | 6,010 |
| Gd₂Se₃ (Gadolinium Sesquiselenide) | Cu | 7,000 | 3,400 5,750 |
| DyAs (Dysprosium Arsenide) | Cu | 10,000 | 23,000 |
| ErSb (Erbium Antimonide) | Cu | 12,000 | 15,000 |
| Yb₂Te₃ (Ytterbium Sesquitelluride) | Cu | 8,000 | 9,000 16,000 |
| GdSi (Gadolinium Silicide) | Ca | 10,000 | 3,400 8,000 |
| Gd₂Si₃ (Gadolinium Sesquisilicide) | Ba | 10,000 | 3,400 8,000 |

From the foregoing, it will be noted that the excitation currents range between about 5000 amperes per square centimeter to about 15,000 amperes per square centimeter, while emission wave lengths vary from between about 3400 Angstrom units to 23,000 Angstrom units.

Although the invention has been shown in connection with certain specific examples, it will be readily apparent to those skilled in the art that various changes in composition can be made to suit requirements without departing from the spirit and scope of the invention.

I claim as my invention:

1. A material capable of amplifying wave energy by carrier injection at a P-N junction comprising single crystal material formed by combining an element selected from the group consisting of the rare earth elements with at least one element selected from the group consisting of boron, carbon, nitrogen, silicon, phosphorus, sulphur, arsenic, antimony, selenium and tellurium, the crystal being intrinsically N-type and having a portion thereof doped with a P-type impurity to form a P-N junction.

2. A material capable of amplifying wave energy by carrier injection at a P-N junction comprising single crystal material formed by combining an element selected from the group consisting of the rare earths with at least one element selected from the group consisting of boron, carbon, nitrogen, silicon, phosphorus, sulphur, arsenic, antimony, selenium and tellurium, the crystal being intrinsically N-type and having a portion thereof doped with a P-type impurity selected from the group consisting of calcium magnesium, copper and barium to form a P-N junction.

3. A material capable of amplifying wave energy by carrier injection at a P-N junction comprising a single crystal of gadolinium phosphide having a portion thereof doped with calcium to form a P-N junction.

4. A material capable of amplifying wave energy by carrier injection at a P-N junction comprising a single crystal of scandium carbide having a portion thereof doped with magnesium to form a P-N junction.

5. A material capable of amplifying wave energy by carrier injection at a P-N junction comprising a single crystal of lanthanum tetraboride having a portion thereof doped with calcium to form a P-N junction.

6. A material capable of amplifying wave energy by carrier injection at a P-N junction comprising a single crystal of lanthanum hexaboride having a portion thereof doped with calcium to form a P-N junction.

7. A material capable of amplifying wave energy by carrier injection at a P-N junction comprising a single crystal of yttrium sesquicarbide having a portion thereof doped with copper to form a P-N junction.

8. A material capable of amplifying wave energy by carrier injection at a P-N junction comprising a single crystal of praseodymium phosphide having a portion thereof doped with calcium to form a P-N junction.

9. A material capable of amplifying wave energy by carrier injection at a P-N junction comprising a single crystal of neodymium nitride having a portion thereof doped with copper to form a P-N junction.

10. A material capable of amplifying wave energy by carrier injection at a P-N junction comprising a single crystal of cerium phosphide having a portion thereof doped with calcium to form a P-N junction.

11. A material capable of amplifying wave energy by carrier injection at a P-N junction comprising cerium sesquisulfide having a portion thereof doped with calcium to form a P-N junction.

12. A material capable of amplifying wave energy by carrier injection at a P-N junction comprising a single crystal of gadolinium sesquiselenide having a portion thereof doped with copper to form a P-N junction.

13. A material capable of amplifying wave energy by carrier injection at a P-N junction comprising a single crystal of dysprosium arsenide having a portion thereof doped with copper to form a P-N junction.

14. A material capable of amplifying wave energy by carrier injection at a P-N junction comprising a single crystal of erbium antimonide having a portion thereof doped with copper to form a P-N junction.

15. A material capable of amplifying wave energy by carrier injection at a P-N junction comprising ytterbium sesquitelluride having a portion thereof doped with copper to form a P-N junction.

16. A material capable of amplifying wave energy by carrier injection at a P-N junction comprising a single crystal of gadolinium silicide having a portion thereof doped with calcium to form a P-N junction.

17. A material capable of amplifying wave energy by carrier injection at a P-N junction comprising a single crystal of gadolinium sesquisilicide having a portion thereof doped with barium to form a P-N junction.

No references cited.

DAVID L. RECK, *Primary Examiner.*

CHARLES N. LOVELL, *Assistant Examiner.*